(12) United States Patent
Peters

(10) Patent No.: US 7,386,115 B2
(45) Date of Patent: Jun. 10, 2008

(54) COMBINED CALLER AND AGENT ENDPOINT MANAGER

(76) Inventor: Michael Peters, 1109 Oxford St., Downers Grove, IL (US) 60516

( * ) Notice: Subject to any disclaimer, the term of this patent is extended or adjusted under 35 U.S.C. 154(b) by 367 days.

(21) Appl. No.: 10/044,868

(22) Filed: Jan. 10, 2002

(65) Prior Publication Data

US 2003/0128833 A1 Jul. 10, 2003

(51) Int. Cl.
*H04M 3/00* (2006.01)
*H04M 5/00* (2006.01)

(52) U.S. Cl. .................... 379/265.09; 379/265.01; 379/265.12; 379/265.13

(58) Field of Classification Search ........... 379/265.09, 379/265.01, 266.01, 266.08, 88.13, 265.02, 379/265.13, 265.12, 266.02, 266.1; 370/252, 370/265.09, 469, 352; 709/227, 230; 455/17
See application file for complete search history.

(56) References Cited

U.S. PATENT DOCUMENTS

| | | | |
|---|---|---|---|
| 4,360,927 A * | 11/1982 | Bowen et al. ................ 455/17 |
| 4,658,435 A * | 4/1987 | Childress et al. ............. 455/17 |
| 4,682,367 A * | 7/1987 | Childress et al. ............. 455/17 |
| 5,247,569 A * | 9/1993 | Cave ..................... 379/266.08 |
| 5,327,490 A * | 7/1994 | Cave ..................... 379/266.01 |
| 5,555,179 A | 9/1996 | Koyama et al. |
| 5,724,406 A * | 3/1998 | Juster .................... 379/88.13 |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,188,673 B1 * | 2/2001 | Bauer et al. ................ 370/252 |
| 6,256,322 B1 * | 7/2001 | Wilson, Jr. ................. 370/469 |
| 6,304,653 B1 * | 10/2001 | O'Neil et al. .......... 379/265.09 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,449,356 B1 * | 9/2002 | Dezonno ............... 379/265.01 |
| 6,611,590 B1 * | 8/2003 | Lu et al. ................ 379/265.09 |
| 6,732,156 B2 | 5/2004 | Miloslavsky |
| 6,757,731 B1 * | 6/2004 | Barnes et al. ................ 709/227 |

(Continued)

*Primary Examiner*—Thjuan K. Addy
(74) *Attorney, Agent, or Firm*—Welsh & Katz, Ltd.

(57) ABSTRACT

A method and apparatus are provided for supporting client calls within a private computer network of an organization having a plurality of agents. The method includes the steps of detecting receipt of a call from a client of the organization through an interface of the private computer network of the organization with a public communication network, determining a type of the received call, spawning a routing process based upon the determined type of call and routing the call to an agent of the plurality of agents based upon the type of call and the spawned routing process.

40 Claims, 3 Drawing Sheets

U.S. PATENT DOCUMENTS

| | | |
|---|---|---|
| 7,165,112 B2 * | 1/2007 | Battin et al. ................. 709/230 |
| 2002/0176404 A1 * | 11/2002 | Girard ........................ 370/352 |
| 2007/0110043 A1 * | 5/2007 | Girard ........................ 370/352 |

* cited by examiner

COMBINED CALLER AND AGENT ENDPOINT MANAGER

FIELD OF THE INVENTION

The field of the invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may automatically retrieve and download customer records to the agent's terminal at the same instant as the call arrives.

In order to route calls, call centers typically rely upon the use of matrix switches to establish the switched circuit connections of conventional telephone calls. While the use of matrix switches are effective, they are expensive to build and operate. Accordingly, a need exists for a method of operating a call center that does not rely upon matrix switches.

SUMMARY

A method and apparatus are provided for supporting client calls within a private computer network of an organization having a plurality of agents. The method includes the steps of detecting receipt of a call from a client of the organization through an interface of the private computer network of the organization with a public communication network, determining a type of the received call, spawning a routing process based upon the determined type of call and routing the call to an agent of the plurality of agents based upon the type of call and the spawned routing process.

DETAILED DESCRIPTION OF AN ILLUSTRATED EMBODIMENT

Figure 1:
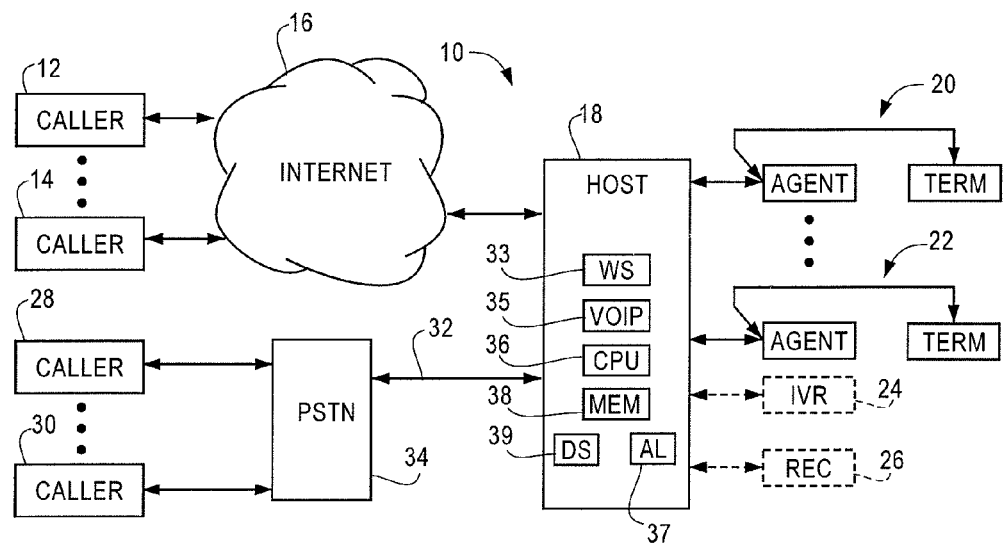
FIG. 1 is a block diagram of a call processing system in accordance with an illustrated embodiment of the invention.

FIG. 1 is a block diagram of a call center 10, shown generally under an illustrated embodiment of the invention. Under the illustrated embodiment, calls may be received from (or placed to) customers 12, 14, 28, 30 through any of a number of public communication networks (e.g., the public switch telephone network (PSTN) 347 the Internet 16, etc.).

The call center 10 may be used by an organization (e.g., a merchant, a political organization, etc.) to setup call connections through the PSTN or Internet between an external client of the organization and a selected agent of the organization for purposes of advancing the agenda of the organization.

For example, where the organization is a merchant, the call center 10 may be structured around a telephone connection (e.g., a set of incoming trunk lines) 32 with the PSTN 34 and/or a website 40, that is provided to promote the wares of the merchant and through which calls may be placed (e.g., VoIP, chat sessions, e-mail, etc.). The merchant may advertise its wares through television or newspaper ads. The ads may provide a telephone number associated with the telephone connection 32 of the message processing system 10 or the Internet address (i.e., the URL) of the website 40. Alternatively, the organization may set up links to the website 40 from search engines or from the websites of other merchants selling related merchandise.

The call processing system 10 differs from prior art call centers in a number of regards. For example, rather than handling calls using switched circuit connections and a matrix switch, the host processing unit 18 may service voice calls through a set of protocol stacks (PSs) 40, 42 using a VoIP protocol. A first network interface card (NIC) 81 may be used as an interface between a first PS 42 and the switched circuits of the PSTN 34 through trunk connection 32. A second NIC card 84 may be used between the second PS 40 and the Internet 16.

Further, while the prior art use of VoIP has been limited to point-to-point connections, a set-up application within the host 18 may function to analyze call requests and form connections among clients and agents using the PSs 40, 42 based upon the nature of the call request and the business rules of the organization. Further, because of the nature of the connection process, virtually any call entity and number of call participants may be connected to a call.

Within FIG. 1, agents and the agent stations are generally referred to by either reference number 20 or 22. Each agent station 20, 22 would be understood to include an audio device (e.g., a headset), labeled "AGENT" in FIG. 1 and a computer terminal, labeled "TERM" in FIG. 1. Since audio information is exchanged within the call processing center 10 under a VoIP format, the audio device and terminal may be part of a single device (i.e., a terminal with a connected headset). As such, the headset and/or terminal may be appropriately referred to herein using the reference number of the agent station 20, 22.

Turning first to the PSs 40, 42, an explanation will be provided of how information is transferred among call participants using the protocol stacks 40, 42. Following the explanation of information transfer among the protocol stacks, an explanation will be provided of how protocol stack locations are assigned to call participants.

As shown, a host 18 (offering a connection and conferencing functionality) may be interposed between call participants 12, 14 connected through the Internet 16 and a number of other participants (e.g., agents 20, 22, interactive voice response (IVR) unit 24 or an audio recorder 26). Participants may also include callers 28, 30 connected to a VoIP conference call at least partially through switched circuit connections within the public switched telephone network 34.

Figure 2:
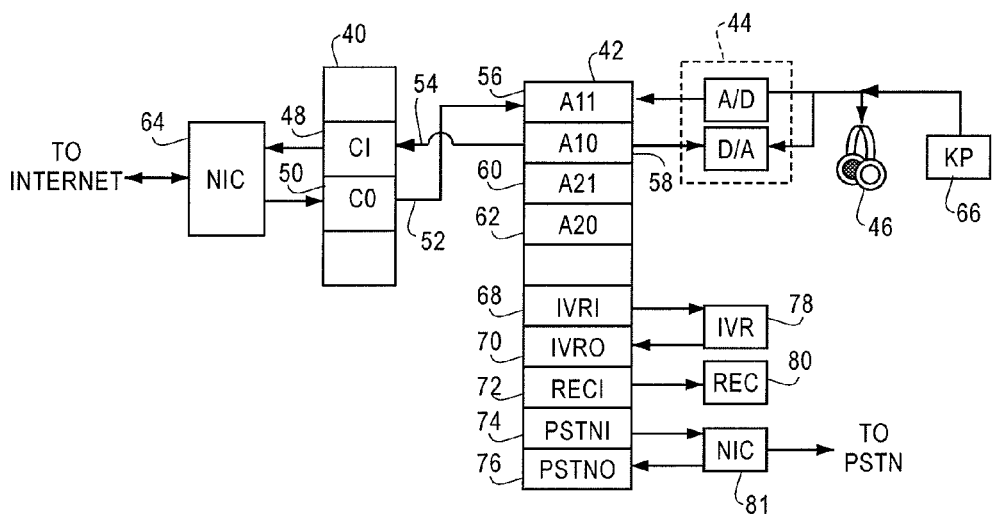
FIG. 2 depicts call flow between protocol stacks of the system of FIG. 1.

FIG. 2 depicts structure within the host 18 which may be used to process VoIP information between a caller 12, 14 and an agent 20, 22. For purposes of explanation, an Internet protocol stack (PS) 40 and enterprise PS 42 may be understood to delineate the boundaries of those VoIP processes which occur within a CPU 36 of the host 18 and those processes which occur outside the CPU 36. It should be understood that the PSs 40, 42 may be part of a single PS.

FIG. 2 also shows an additional network interface card 44 that may be used to interface the CPU 36 with other external devices. While NICs 44 and 64 are shown as separate devices, it should be understood that under certain conditions (e.g., the agent telephone 46 is a LAN phone as suggested by FIG. 1) then NICs 44 and 64 may be substantially identical.

As shown, the Internet PS 40 includes a number of predetermined logical ports 48, 50 that may be used to provide a two-way connection with the caller 12, 14 through the Internet 16. One logical port 48 is provided for caller input (information from the agent 20, 22 to the caller 12, 14). A second logical port 50 is provided for caller output (information from the caller 12, 14 to the agent 20, 22).

The enterprise PS 42 within the host 18 also provides a number of predetermined ports 56, 58, 60, 62 for interfacing agents 20, 22 with the VoIP processes occurring within the CPU 36. Other ports 68, 70 of the enterprise PS 42 may be used to interface an interactive voice response (IVR) unit 78 to a call. An output port 72 may be used to provide information to a recording device 80. A further set of ports 74, 76 may be used to interface conference calls from the PSTN 34.

In the case of the agents 20, 22, a first set of ports 56, 60 may allow the VoIP software 35 (hereinafter "the software" or "the VoIP conferencing software") to receive voice information from the agents 20, 22. A second set of ports 58, 62 may be used to transfer voice information from the VoIP process to the agents 20, 22.

To set up a call, an agent 20, 22 may enter an IP address of a called party 12, 14 through a keypad or keyboard 66. The software within the CPU 36 may accept the IP address and transmit a set-up request to the called party. The CPU 36 under control of the VoIP conference software may also begin setting up the VoIP structures of FIG. 2. To facilitate the flow of voice information, the CPU 36 may form a first connection 54 for outbound information (from the agent to the called party) and a second connection 52 for inbound information (voice information from the called party to the agent).

Turning first to the agent side of the VoIP connection, information exchanged between the agent 20, 22 and the NIC 44 may be exchanged under a pulse code modulation (PCM) format. The CPU 36, may cause the PCM information transceived through the NIC 44 to be reformatted into a real time protocol (RTP) format for use by the enterprise PS 42. Any appropriate RTP format (e.g., G.711, G.723, G.729, etc.) may be used.

Similarly, the CPU 36 may reformat the RTP information exchanged between the Internet PS 40 and the Internet 16. More specifically, the CPU 36 and NIC 64 may convert the RTP data of the protocol stack 40 into an appropriate communication protocol (e.g., H.323) used for communicating through the Internet 16.

Based upon the address entered through the key pad 66, the CPU 36 may exchange the VoIP voice information between the agent's enterprise ports 56, 58 and the Internet ports 48, 50. Based upon the transfers, the agent 20, 22 may converse with a called party 12, 14 using VoIP telephony.

Upon occasion, the first agent (A1) may choose to conference in a second agent (A2). To conference in the second agent A2, the CPU 36 forms a number of software mixers 82, 84, 86 (FIG. 3) for processing voice information. The mixers 82, 84, 86 may operate under a simple algorithm (e.g., (A+B)/2) intended to mix the voice information of two callers (i.e., A and B).

Figure 3:
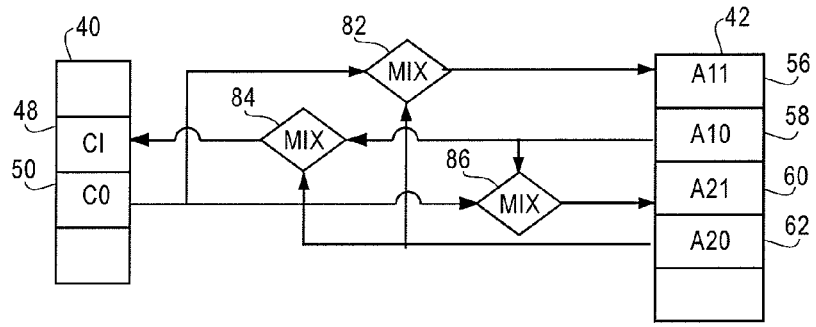
FIG. 3 depicts details of the call flow of FIG. 2.

As shown in FIG. 3, incoming RTD data (i.e., caller output) received at a port 50 from a caller 12, 14 is mixed in a first mixer 82 with incoming RTD data (i.e., agent output) from an incoming port 62 of the second agent A2. The output of the mixer 82 is provided as output RTD data to incoming port 56 of the first agent A1.

Similarly, incoming RTD data received at port 50 from a caller 12, 14 is mixed in a second mixer 86 with incoming RTD data from incoming port 58 of the first agent A1. The output of the second mixer is provided as output RTD data to incoming port 60 of the second agent A2.

Finally, incoming RTD data received at a port 58 from a first agent A1 is mixed in a third mixer 84 with incoming RTD data from an output port 62 of the second agent A2. The output of the third mixer 84 is provided as output RTD data to incoming port 48 of the caller 12, 14.

Figure 4:
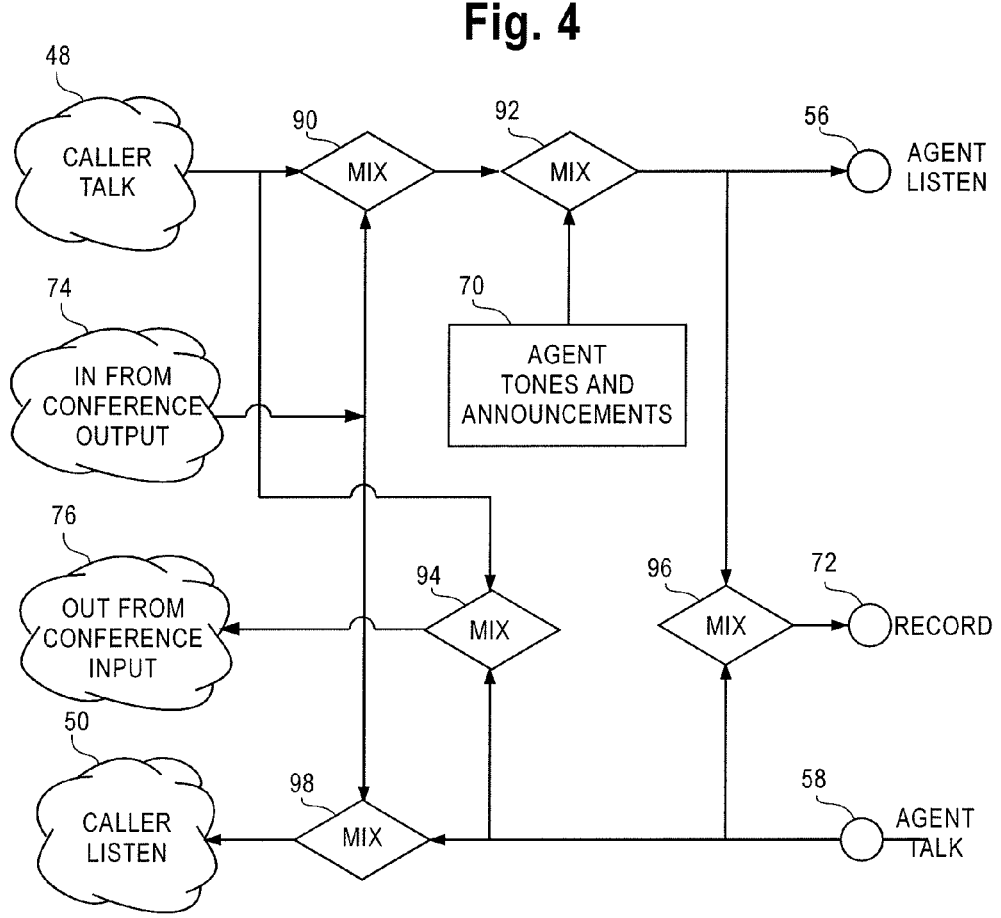
FIG. 4 depicts further details of the call flow of FIG. 2.

FIG. 4 depicts another illustrated embodiment where conferencing may be extended to other resources. As shown in FIG. 4 mixing may be performed of voice information from any of a number of sources. For example, tones and announcements may be played from an IVR 78 that may be heard only by the agent.

For example, the CPU 36 may receive a message requesting set-up of a VoIP telephony connection from a caller 12, 14. Based upon the source IP address of the message, the CPU 36 may be able to retrieve information about the call originator 12, 14 from memory 38. Based upon the identity of the call originator 12, 14, the CPU 36 may select one or more messages from the IVR 78 to be played for the benefit of the agent 20, 22. Upon selecting the messages, the CPU 36 may activate message playback through the IVR 78 at the same time that the packet-based voice-path is set up through mixers 90, 92 and 98. Since the message is mixed in mixer 92 in the inbound voice path to the agent, the caller does not hear the message.

Alternatively, the agent 20, 22 may choose to record the call. Recording may be necessary in the case of threatening or harassing calls. To record the call, the agent 20, 22 may enter a RECORD instruction through a keypad 66. In response, the CPU 36 may activate a recorder 80. The CPU 36 may also activate mixer 96. The mixer 96 mixes agent outgoing voice information with caller incoming voice information. The combined voice information is sent to the recorder 80 and recorded.

In another illustrated embodiment, the agent may add a conference input to the call. The conference input may be derived from a set of PSTN ports 74, 76 connected to the PSTN 34 through a NIC 81. The agent 20, 22 may select a conference target by entry of a telephone number of a conference target 28, 30 through the keypad 66. The CPU 36 may outdial the entered telephone number of the conference target 28, 30. When the target 28, 30 answers, the CPU 36 may activate conference mixers 90, 94, 98 to conference in the conference target.

Incoming voice information from the conference target 28, 30 may be mixed with voice information from the caller 12, 14 in a first mixer 90 and transferred to the agent through an incoming agent port 56. Similarly, incoming voice information from the conference target 28, 30 may be mixed with voice information from the agent 20, 22 in a second mixer 98 and transferred to the caller 12, 14 through an outgoing caller port 50. Voice information of both the agent 20, 22 and caller 12, 14 may be mixed in a third mixer 94 and transferred to an outgoing port 76 of the conference target 28, 20.

Figure 5:
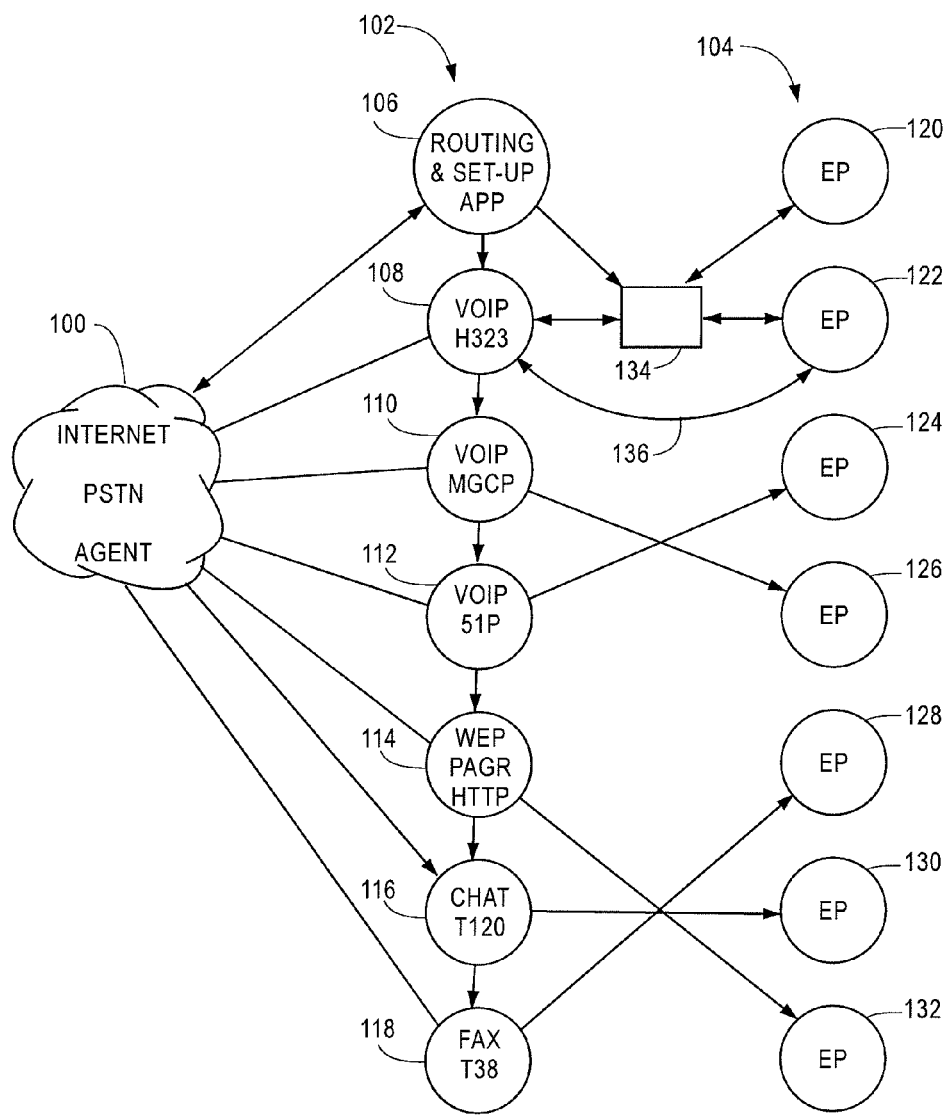
FIG. 5 is a flow diagram of calls through the system of FIG. 1.

Turning now to call set-up, a discussion will be provided of the process for setting up the calls discussed above. FIG. 5 may be used in this regard to depict the process of call set-up and support.

As shown in FIG. 5, a set of applications 106, 108, 110, 112, 114, 116, 118 may exist between the Internet/PSTN 100 and endpoints (EPs) 120, 122, 124, 126, 128, 130, 132. For purposes of explanation, it may be assumed that the EPs 120, 122, 124, 126, 128, 130, 132 may be agents 20, 22; IVR 78 or REC 80. It may also be assumed that each of the EPs represent enterprise stack locations 56, 58, 60, 62, 68, 70, 72 associated with a particular logical entity (i.e., agent 20, agent 22; IVR 78 or REC 80).

It may also be assumed that any particular EP may be the target of more than one application (e.g., wherein an Internet VoIP call to an agent is conferenced with a PSTN call. It also may be assumed that an EP could also be a customer 12, 14, 28, 30 contacted by an agent 20, 22 during an outgoing call campaign.

Similarly, the Internet/PSTN 100 may also be assumed to be a set of stack locations. In the case of the PSTN one set of stack locations 74, 76 may exist for each trunk line within the PSTN connection 32. However, this is not necessary in that addressing of the individual trunk lines 32 may be handled within the NIC 81 via a VoIP H.323 process.

In the case of the Internet, an expandable set of stack locations 48, 50 may be used depending upon the load. In the case of the stack locations 50 for caller output, the number of locations 50 may be allocated to be only 80% loaded. As the load changes, the number of stack locations may be increased or decreased. The stack location 48 for caller input may be similarly provisioned.

A setup application (SA) 106 may be provided to continuously scan and read idle input stack locations 50, 58, 62, 76. The SA 106 and applications 108, 110, 112, 114, 116, 118 may be assumed to be software layers that reside above and that provide additional functionality to the description on connectivity provided above.

As incoming messages are detected, the SA 106 may read the incoming messages, determine the type of message involved (e.g., VoIP under H.323, VoIP under MGCP, VoIP under SIP, web page under http, chat under T.120, fax under T.38, etc.) and spawn a call processing application 108, 110, 112, 114, 116, 118 to set up and handle the call. Further, once an application is assigned, the SA 106 may interact with the application to determine and allocate the resource (e.g., agent 20, 22, IVR, etc.) to handle the call.

For example, arrival of a call from a caller (e.g., through telephone 28) through the PSTN 34 may cause a call arrival message to be delivered to a stack location 76. The SA 106 upon reading the location 76 may detect and recover call associated information (e.g., ANI, DNIS, etc.) contained within the call arrival message.

From the ANI information, the SA 106 may determine the identity of the caller. The SA 106 may also determine a call destination from the DNIS information, where the organization uses a number of different telephone numbers (e.g., for different organizational departments).

With the identity of the caller and call destination, the SA 106 may, by reference to an agent skill list 37, select an agent (e.g., agent 20). Upon selecting an agent 20, the SA 106 may also retrieve customer records from a customer database 39 and transfer them in the form of a screen pop to the terminal 20 using conventional techniques.

The SA 106 may also independently spawn a VoIP application 108 operating under an H.323 protocol for exchanging voice information between the selected agent 20 and the caller 28, 30. The VoIP application 108 may be spawned with a first end operatively coupled to the call stack locations 74, 76 and a second end operatively coupled to stack locations 56, 58.

As an alternative example, the SA 106 may scan and detect the arrival of a VoIP call request at stack location 50 through the Internet 16 from a caller (e.g., through terminal 12). The call request may originate from a JAVA script operating from within a web page downloaded from the website 33 or from an independent process operating within the terminal 12.

The SA 106 may retrieve and determine a format of the message (e.g., VoIP under H.323, VoIP under MGCP, VoIP under SIP, etc.). Upon determining the format of the message, the SA 106 may spawn a VoIP application 108, 110, 112 compatible with the determined format.

In conjunction with spawning an application compatible with the determined format, the SA 106 may also select an agent to service the call. The agent 20, 22 may be selected based upon agent idle time or upon call associated information derived from the call request. Call associated information, in this case, may include the format of the call request, the URL of the caller or, in the case of an e-mail call, content using key word recognition. Where the call request originated from access to the web site 33, the call associated information may also include any web pages visited.

Retrieval of call associated information may be accomplished during the process of initial message retrieval and format determination by the SA 106. The call associated information may also be provided by the spawned application 108, 110, 112 as part of (or immediately after) set up of the spawned application.

Once the spawned application 108, 110, 112 has been set up, the application may begin exchanging voice information between the caller 12 and selected agent 20, 22. As above, the spawned application may be operatively coupled and exchange voice information between the stack location of the selected agent and stack location 48, 50 of the Internet 16.

A direct call between a customer 12 and agent 22 may be diagrammed in FIG. 5 by elements 100, 108 and 122 via path 136. A conference call, as described above, adding agent 20 may additionally include elements 120 and 134.

Similarly, a call in the form of a chat request under a T.120 format may be detected and identified by the SA 106. The SA 106 may retrieve a URL of the caller and identify an agent 20, 22 based upon the URL and chat capabilities of the agent 20, 22 from the agent list 37. Once an agent 20, 22 has been identified, the SA 106 may activate a chat application 116.

As would be clear to those of skill in the art, the chat application 116 is not based upon a real time protocol. As such and once spawned, the application 116 simply exchanges chat messages between the selected agent and caller 12, 14.

Similarly, other call requests (e.g., web pages under http, fax transmissions under a T.38 format, etc.) may be detected and identified by the SA 106. As discussed above, the SA 106 may identify an agent based upon a URL of the caller and spawn an application 114, 118.

Once spawned the application 114, 118 may transfer the call to the terminal of the selected agent 20, 22. The spawned application 114, 118 may also function to route responses back to the originating caller.

A specific embodiment of a method and apparatus for distributing calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of supporting client calls within a private computer network of an organization having a plurality of agents, such method comprising the steps of:
    detecting receipt of a call from a client of the organization through an interface of the private computer network of the organization with a public communication network;
    continuously scanning and reading idle input stack locations of a protocol stack of the client to detect received calls and determining a type of the received call;
    selecting an agent of the plurality of agents based upon the determined type of call; and
    independently spawning a call processing application based upon the determined type of call and upon the selected agent with a first end of the independently spawned call processing application operatively coupled to a predetermined protocol stack of the selected agent and with a second end of the independently spawned call processing application operatively coupled to the protocol stack of the client, said independently spawned call processing application being operable to exchange information between the selected agent and the client, said protocol stack of the agent and protocol stack of the client being disposed inside the private computer network and wherein communication between the predetermined protocol stack of the agent and protocol stack of the client operates under a first protocol and communication between the protocol stack of the client and the client through the public communication network operates under a second protocol.

2. The method of supporting client calls as in claim 1 further comprising detecting call associated information received along with the call.

3. The method of supporting client calls as in claim 2 further comprising selecting the agent for connection to the call based upon the call associated information.

4. The method of supporting client calls as in claim 3 further comprising identifying the client from the call associated information.

5. The method of supporting client calls as in claim 4 further comprising retrieving client information based upon the identity of the client.

6. The method of supporting client calls as in claim 5 further comprising transferring the retrieved client information to the selected agent along with delivery of the call to the agent.

7. The method of supporting client calls as in claim 1 further comprising routing call information from the client to the agent under a TCP/IP format.

8. The method of supporting client calls as in claim 1 further comprising defining the call type as a VoIP call under at least one of an H323 format, a SIP format and a MGCP format.

9. The method of supporting client calls as in claim 1 further comprising defining the call type as a web page call under an http format.

10. The method of supporting client calls as in claim 1 further comprising determining a format of the call and spawning an application compatible with the determined format.

11. The method of supporting client calls as in claim 1 further comprising defining the call type as an T120 chat session call under a T120 format.

12. The method of supporting client calls as in claim 1 wherein the protocol stacks each comprise a number of stack locations, the number of stack locations being increased or decreased based upon load.

13. The method of supporting client calls as in claim 1 further comprising conferencing a third party into the call using a plurality of software mixers operatively coupled between the protocol stack of the agent and the protocol stack of the client.

14. The method of supporting client calls as in claim 1 wherein the protocol stacks use a VoIP protocol.

15. The method of supporting client calls as in claim 13 wherein the step of conferencing a third party into the call further comprises adding another client as the third party.

16. An apparatus for supporting client calls within a private computer network of an organization having a plurality of agents, such apparatus comprising:
    means for detecting receipt of a call from a client of the organization through an interface of the private computer network of the organization with a public communication network;
    means for continuously scanning and reading idle input stack locations of a protocol stack of the client to detect received calls and for determining a type of the received call;
    means for selecting an agent of the plurality of agents based upon the determined type of call;
    means for independently spawning a call processing application based upon the determined type of call and upon the selected agent with a first end of the independently spawned call processing application operatively coupled to a predetermined protocol stack of the selected agent and with a second end of the independently spawned call processing application operatively coupled to the protocol stack of the client, said independently spawned call processing application being operable to exchange information between the selected agent and the client, said protocol stack of the agent and protocol stack of the client being disposed inside the private computer network and wherein communication between the predetermined protocol stack of the agent and protocol stack of the client operates under a first protocol and communication between the protocol stack of the client and the client through the public communication network operates under a second protocol.

17. The apparatus for supporting client calls as in claim 16 further comprising means for detecting call associated information received along with the call.

18. The apparatus for supporting client calls as in claim 17 further comprising means for selecting the agent for connection to the call based upon the call associated information.

19. The apparatus for supporting client calls as in claim 18 further comprising identifying the client from the call associated information.

20. The apparatus for supporting client calls as in claim 19 further comprising retrieving client information based upon the identity of the client.

21. The apparatus for supporting client calls as in claim 20 further comprising means for transferring the retrieved client information to the selected agent along with delivery of the call to the agent.

22. The apparatus for supporting client calls as in claim 16 further comprising means for routing call information from the client to the agent under a TCP/IP format.

23. The apparatus for supporting client calls as in claim 16 further comprising defining the call type as a VoIP call under an H323 format.

24. The apparatus for supporting client calls as in claim 16 further comprising defining the call type as a web page call under an http format.

25. The apparatus for supporting client calls as in claim 16 further comprising defining the call type as a VoIP call under an SIP format.

26. The apparatus for supporting client calls as in claim 16 further comprising defining the call type as an T120 chat session call under a T120 format.

27. The apparatus for supporting client calls as in claim 16 further comprising defining the call type as a VoIP call under an MGCP format.

28. The apparatus for supporting client calls as in claim 16 further comprising means for conferencing a third party into the call.

29. The apparatus for supporting client calls as in claim 28 wherein the means for conferencing a third party into the call further comprises means for adding another agent as the third party.

30. The apparatus for supporting client calls as in claim 28 wherein the step of conferencing a third party into the call further adding another client as the third party.

31. An apparatus for supporting client calls within a private computer network of an organization having a plurality of agents, such apparatus comprising:
   a protocol stack adapted to receive a call from a client of the organization through an interface of the private computer network of the organization with a public communication network;
   a call criteria adapted to determine a type of the received call;
   a setup application that continuously scans and reads idle input stack locations of a protocol stack of the client to detect received calls, determines the type of the received calls based on the call criteria, and selects an agent of the plurality of agents based upon the determined type of call;
   the set up application being further adapted to independently spawn a call processing application based upon the determined type of call and upon the selected agent with a first end of the independently spawned call processing application operatively coupled to a predetermined protocol stack of the selected agent and with a second end of the independently spawned call processing application operatively coupled to the protocol stack of the client, said independently spawned call processing application being operable to exchange information between the selected agent and the client, said protocol stack of the agent and protocol stack of the client being disposed inside the private computer network and wherein communication between the predetermined protocol stack of the agent and protocol stack of the client operates under a first protocol and communication between the protocol stack of the client and the client through the public communication network operates under a second protocol.

32. The apparatus for supporting client calls as in claim 31 further comprising a network interface card adapted to detect call associated information received along with the call.

33. The apparatus for supporting client calls as in claim 31 further comprising defining the call type as a VoIP call under an H323 format.

34. The apparatus for supporting client calls as in claim 31 further comprising defining the call type as a web page call under an http format.

35. The apparatus for supporting client calls as in claim 31 further comprising defining the call type as a VoIP call under an SIP format.

36. The apparatus for supporting client calls as in claim 31 further comprising defining the call type as an T120 chat session call under a T120 format.

37. The apparatus for supporting client calls as in claim 31 further comprising defining the call type as a VoIP call under an MGCP format.

38. The apparatus for supporting client calls as in claim 31 further comprising means for conferencing a third party into the call.

39. The apparatus for supporting client calls as in claim 31 wherein the means for conferencing a third party into the call further comprises means for adding another agent as the third party.

40. The apparatus for supporting client calls as in claim 38 wherein the step of conferencing a third party into the call further adding another client as the third party.

* * * * *